United States Patent [19]

Gargiulo

[11] Patent Number: 5,538,627
[45] Date of Patent: Jul. 23, 1996

[54] AIR RELEASER

[76] Inventor: Joseph C. Gargiulo, P.O. Box 33623, Decatur, Ga. 30033

[21] Appl. No.: 310,724

[22] Filed: Sep. 22, 1994

[51] Int. Cl.⁶ .................................................. A01K 63/04
[52] U.S. Cl. ............................ 210/169; 119/263; 261/77; 261/124
[58] Field of Search ........................ 114/261, 263, 114/264; 210/416.2, 220, 169, 150, 151; 261/77, 124

[56] References Cited

U.S. PATENT DOCUMENTS

| | | | |
|---|---|---|---|
| 4,163,035 | 7/1979 | Gorsky | 210/169 |
| 4,333,829 | 6/1982 | Walther | 210/169 |
| 4,552,657 | 12/1985 | Ogawa | 210/416.2 |
| 4,802,980 | 2/1989 | Gilkey et al. | 210/416.2 |
| 5,203,990 | 4/1993 | Gargiulo | 210/169 |

*Primary Examiner*—Cynthia L. Nessler
*Attorney, Agent, or Firm*—James B. Middleton

[57] ABSTRACT

An aerator for an aquarium has a connector for connecting the aerator to an existing filter system. An air receiving and dispensing chamber is annular and defined between a lower annulus and an upper perforate annulus. Walls on the lower annulus mate with skirts on the upper, perforate annulus to define inner and outer walls of the chamber. Water flows through the central openings in the annuluses, from the filter, upwardly, and air passes through the upper, perforate annulus. A mixing chamber is received over the upper, perforate annulus, and a tube can be connected to the mixing chamber to carry the aerated water up. An air supply tube extends down through the center of the aerator and connects to the chamber to supply air to the chamber.

4 Claims, 3 Drawing Sheets

AIR RELEASER

BACKGROUND OF THE INVENTION

1. Field of the Invention

This invention relates to air devices for use with aquarium undergravel filters, box filters and sponge filters as opposed to aeration devices which are exterior to the aquarium or mounted to the inside of the aquarium. In particular, the present invention has improved water flow while maintaining simplicity and convenience of operation. It also is economical since it can be used as a lifetime aeration device with minimum maintenance.

2. Description of the Prior Art

There are numerous air devices used for aerating today's aquarium including power heads, air diffusers, and air stones. The air diffusers and air stones are placed inside the aquarium alone or used in addition to filtering units such as box filters, sponge filters and undergravel filters. These units are described in U.S. Pat. Nos. 5,246,282; 5,133,906; 4,776,127; 4,192,255; and 4,655,915.

There are several drawbacks to the general use of these air devices for aquariums. First, the air diffusers are very lightweight and have a tendency to float if not secured. This decreases its aeration effectiveness. Air stones/bubblers, even though they are heavier than the diffusers, have a tendency to become displaced requiring manual placement. Second, these devices become clogged with free floating particles in the air or with algae. Sometimes cleaning the device with a brush is inadequate and soaking the device in a cleansing solution is necessary. Often the device remains clogged and requires replacement. This results in ineffective use of manpower as well as additional expense.

When these devices are used with undergravel filters, box filters and the sponge filters, additional drawbacks become apparent. The major disadvantage of these devices with an undergravel filter is the choking of water/air flow through the lift chamber. This occurs because the device requires space in the lift tube where the water and air also must flow. The effective rate of aeration is reduced because of the inability of the air lift chamber to accommodate the inflow rate of the air entering from the air flow tube. This creates a "bottleneck" effect thus reducing the flow.

Another disadvantage of these devices is the fact the air is released in a direction perpendicular to the natural air flow direction. The air must change directions, reducing the momentum of the air flow and thus the aeration effect is slowed.

SUMMARY OF THE INVENTION

It is the primary purpose of the present invention to offer an alternative aeration device which will eliminate some of the aforementioned of the prior art problems.

A major objective of this invention is to provide an aeration device which will provide an economical and easy means of aquarium aeration. Other aeration devices require frequent cleaning and replacement. The present invention provides for easy cleaning with the use of a brush for a lifetime use.

An additional objective of the invention is to offer an aeration device without reducing mass flow rates. The present invention accomplishes this by eliminating the aeration mechanism from the center of the lift tube. An air line is the only object in the lift tube, and the lift tube is sized to permit adequate mass flow rates. Aeration is accomplished by multiple rows of tiny apertures which separate the air and water chamber from the lift tubes instead of occupying valuable space in the center of the chamber. By removing this obstruction, the air and water mass flow rate is improved.

A further aim of the air releaser is to provide the release of air in an upward direction. This release of air in the direction of the water flow reduces momentum losses due to turning.

Another purpose of this invention is to provide for an aesthetic aeration device. The aerator is transparent and adapts easily to standard undergravel filters and lift tubes. Once inserted, the device becomes virtually invisible.

Briefly, in accordance with the present invention, there is offered an inside aquarium aerator. The aerator includes a funnel shaped component which forms an air and water chamber in conjunction with the lower components. The funnel shaped component attaches to a center annular component by means of male and female connectors. The lower component completes the water/air chamber and the aeration chamber. The air tubing runs down the air and water chamber and connects to the circular protrusion in the center annular component. Once the air line is connected, air is delivered to the aeration chamber. The air escapes from the aeration chamber through the apertures in the superior end of the component. Bubbles are formed and move in an upward direction forcing water to move up through the air/water chamber and aerating the contents of the aquarium.

DESCRIPTION OF THE PREFERRED EMBODIMENT

Figure 1:
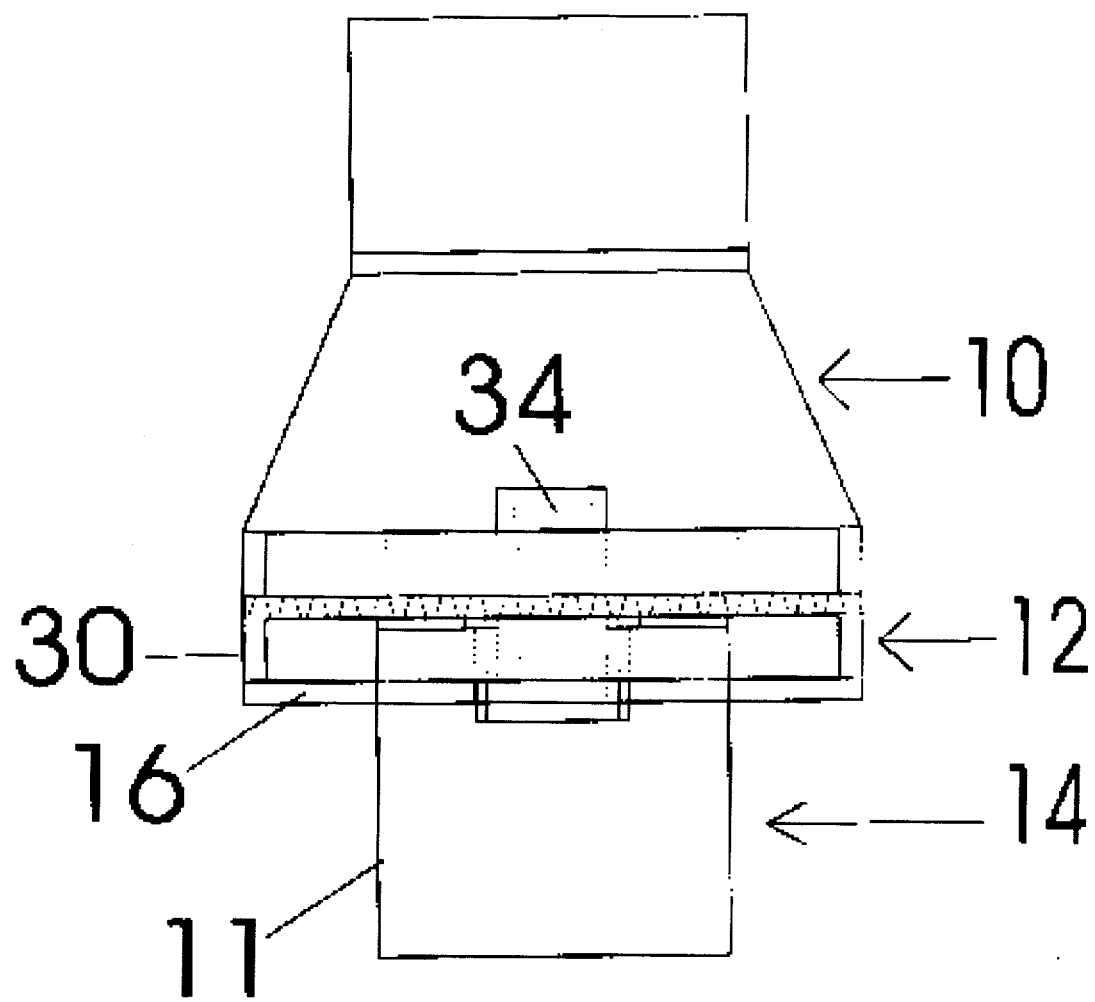
FIG. 1 is a front elevational view of an embodiment of the present invention.

Referring now more particularly to the drawings, and to that embodiment of the invention here presented by way of illustration, the device shown in FIG. 1 comprises an air and water mixing and lift chamber 10, an air chamber 12, and a connector 14 for connecting the device to an existing aquarium filter. As is best shown in FIG. 2, the three pieces 10, 12 and 14 fit together by means of male and female connectors.

Figure 6:
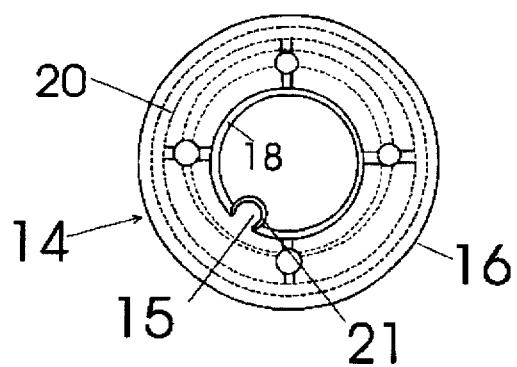
FIG. 6 is a cross-sectional view taken along the line 6—6 in FIG. 2.
Figure 7:
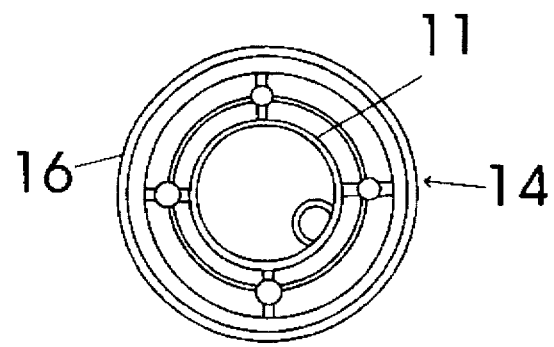
FIG. 7 is a cross-sectional view taken along the line 7—7 in FIG. 2.

The connector 14 has a cylindrical portion 11 extending down from an annulus 16, and concentric therewith. The upper side of the annulus 16 carries inner and outer walls 18 and 20 which partially define the air receiving and dispensing chamber. The annulus defines an opening within the inner wall 18. Looking especially at FIG. 6 of the drawings, there is a discontinuity 15 in the wall 18, and a partially cylindrical air entrance 21 bridging the discontinuity 15.

This air entrance 21 acts as the male member for connection to the air chamber 12.

Figure 2:
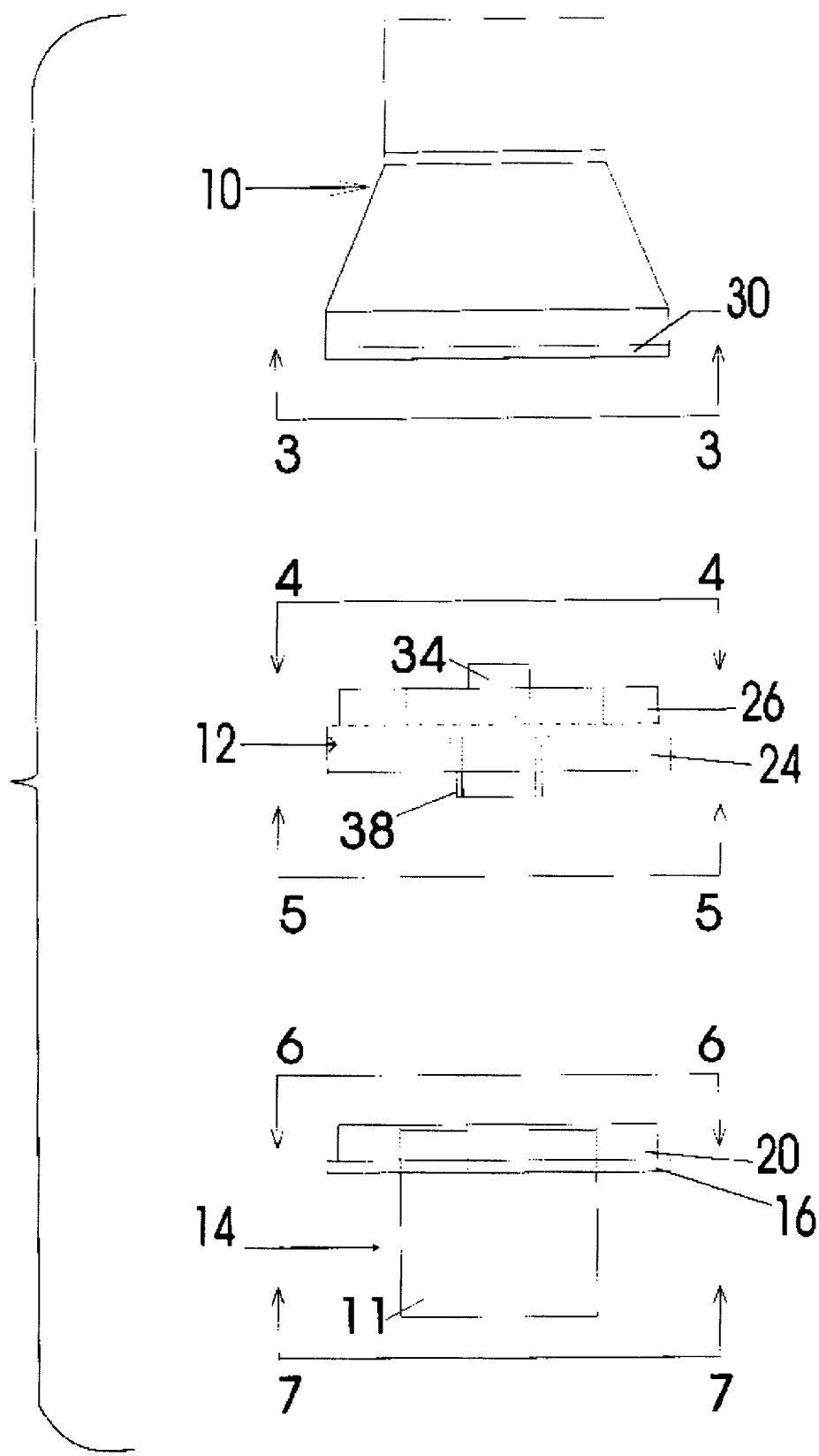
FIG. 2 is an exploded view of the device shown in FIG. 1.
Figure 4:
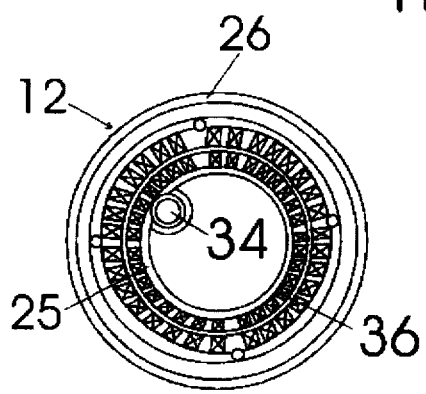
FIG. 4 is a cross-sectional view taken along the line 4—4 in FIG. 2.
Figure 5:
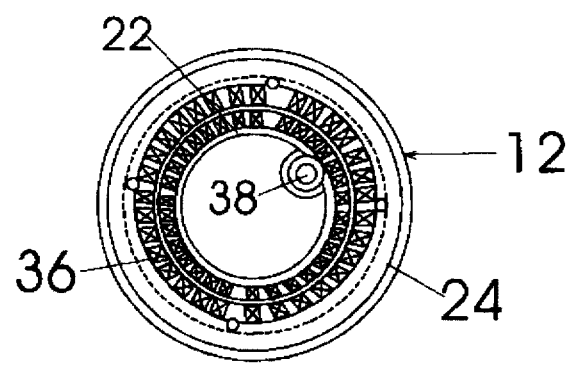
FIG. 5 is a cross-sectional view taken along the line 5—5 in FIG. 2.

Turning then to the air chamber 12 as best shown in FIGS. 2, 4 and 5, there is a perforate annulus 36 having a skirt 24 extending down from its periphery and engageable with the wall 20 of the connector 14. An inner skirt 22 engages the wall 18 of the connector 14 to complete the air receiving and dispensing chamber, and defines an opening centrally thereof.

With attention to FIG. 5 of the drawings, it will be seen that the skirt 22 has a discontinuity, with a partially cylindrical air entrance 38 bridging the discontinuity. This air entrance 38 is the female connector to match the air entrance 21 of connector 14. It should therefore be understood that, when the air chamber 12 is joined to the connector 14, the walls 20 and 18 mate with the skirts 24 and 22 to provide inner and outer walls. The annulus 16 defines the lower surface, and the perforate annulus 36 defines the upper surface, so a complete enclosure is provided. The discontinuities in the wall 18 and the skirt 22 allow entrance of air through the air entrance 38 and 21.

Figure 3:
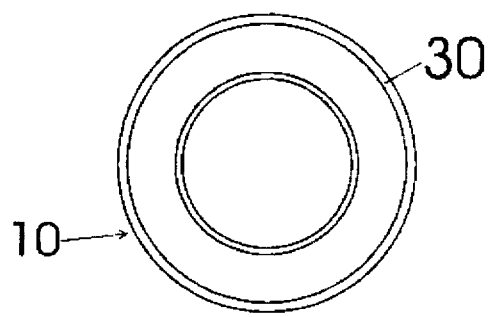
FIG. 3 is a cross-sectional view taken along the line 3—3 in FIG. 2.

The upper side of the air chamber 12 includes a wall 26 extending upwardly therefrom for receiving the lower end of the mixing chamber. An inner wall 25 is provided primarily for strength of the piece, and a nipple 34 is formed integrally with the wall 25 and concentric with the partially cylindrical air entrance 38. As can be seen in FIGS. 2 and 3, the nipple 34 can receive an end of an air supply tube for delivering air to the air receiving and dispensing chamber.

It will therefore be understood that the connector 14 will be received within an aquarium and attached to the existing filter by means of the cylinder 11. The air chamber 12 and mixing chamber 10 will be fixed to the connector 14 as described. Air will be introduced through the nipple 34, and will pass into the chamber formed between the annuluses 16 and 36. Since the annulus 36 is perforated, the air will be discharged therethrough in an upward direction, which is parallel to the flow of water through the center opening.

I claim:

1. An aquarium aerator comprising a connector for connecting said aerator to an aquarium filter system, said connector including an annulus having a cylinder extending down therefrom and concentric walls extending up therefrom, said concentric walls including an inner wall and an outer wall, said inner wall defining a discontinuity therein, said aerator further including an air chamber comprising a perforate annulus having concentric skirts extending down therefrom, said concentric skirts mating with said concentric walls on said annulus, said concentric skirts including an inner skirt and an outer skirt, said inner skirt defining a discontinuity therein located adjacent to said discontinuity in said inner wall on said annulus, said aerator also including a mixing chamber means receivable on said air chamber such that air passing through said perforate annulus will be within said mixing chamber means, and air entrance means for conducting air to said discontinuities.

2. An aquarium aerator as claimed in claim 1, wherein said perforate annulus includes a wall extending up therefrom, said wall receiving said mixing chamber means thereon.

3. An aquarium aerator as claimed in claim 1, wherein said annulus defines a central opening for allowing the flow of water therethrough, and said perforate annulus defines a central opening concentric with said central opening in said annulus.

4. An aquarium aerator as claimed in claim 3, wherein said air entrance means is disposed within said central opening.

* * * * *